United States Patent [19]
Takahira et al.

[11] Patent Number: 6,012,782
[45] Date of Patent: Jan. 11, 2000

[54] APPARATUS FOR CONTROLLING DIFFERENCES IN BRAKING TORQUE BETWEEN LEFT AND RIGHT WHEELS OF VEHICLE

[75] Inventors: Yousuke Takahira, Toyota; Takahiro Ikeuchi, Susono; Shinichi Yamada, Anjo, all of Japan

[73] Assignees: Toyota Jidosha Kabushiki Kaisha, Toyota-shi; Denso Corporation, Kariya-shi, both of Japan

[21] Appl. No.: 08/790,340

[22] Filed: Jan. 27, 1997

[30] Foreign Application Priority Data

Jan. 29, 1996 [JP] Japan ........................................ 8-12660

[51] Int. Cl.[7] ........................................................... B60T 8/58
[52] U.S. Cl. ............................. 303/112; 303/169; 303/176
[58] Field of Search ..................................... 303/112, 169, 303/189, 176

[56] References Cited

U.S. PATENT DOCUMENTS

| | | | |
|---|---|---|---|
| 5,043,898 | 8/1991 | Yoshino | 303/169 |
| 5,249,641 | 10/1993 | Sakata | 303/169 |
| 5,333,943 | 8/1994 | Kashiwabara et al. | 303/112 |
| 5,515,279 | 5/1996 | Hrovat et al. | 303/112 |
| 5,539,641 | 7/1996 | Littlejohn | 303/169 |
| 5,653,516 | 8/1997 | Tamguchi et al. | 303/176 |

FOREIGN PATENT DOCUMENTS 62-275870  11/1987  Japan .

*Primary Examiner*—Matthew C. Graham
*Attorney, Agent, or Firm*—Kenyon & Kenyon

[57] ABSTRACT

An apparatus for controlling a left-wheel and a right-wheel braking torque applied to a left and a right wheel of a motor vehicle running on a road surface, respectively, when the vehicle is braked, including a torque changing device which changes each of the left-wheel and right-wheel braking torques, and a controller which controls, in an anti-lock control mode thereof, the torque changing device to prevent each of the left and right wheels from being locked on the road surface, the controller including torque-difference control device for controlling the torque changing device to change at least one of the left-wheel and right-wheel braking torques such that a difference between the left-wheel and right-wheel braking torques is smaller when a deceleration of the vehicle is higher than a threshold value than when the deceleration is not higher than the threshold value.

15 Claims, 6 Drawing Sheets

FIG. 2

○ FRONT-WHEEL LOW-SELECT CONTROL (STEP S5 OF FIG. 4)

- INITIATING CONDITION

AND
  - INITIAL PRESSURE-DECREASE CONTROL PERIOD
  - VEHICLE SPEED NOT LOWER THAN REFERENCE VALUE
  - VEHICLE DECELERATION NOT LOWER THAN REFERENCE VALUE A

- DETAILS

SAME MODE AS LOWER PRESSURE-CHANGE-LEVEL MODE REQUESTED FOR ONE WHEEL OUTPUT FOR TWO WHEELS

|  | PRESSURE-CHANGE LEVEL |
  | --- | --- |
  | PI MODE* | HIGH |
  | PH MODE | MEDIUM |
  | PD MODE | LOW |

*: PI MODE INCLUDES CONTINUOUS AND PULSE PI MODES

- TERMINATING CONDITION

OR
  - PI MODE REQUESTED FOR TWO WHEELS
  - CURRENT LOW-SELECT CONTROL HAS CONTINUED FOR MORE THAN REFERENCE TIME $T_1$

FIG. 3

○ FRONT-WHEEL MODE-CHANGE CONTROL (STEP S7 OF FIG. 4)

· INITIATING CONDITION

AND
- UNDER ANTI-LOCK CONTROL
- VEHICLE DECELERATION NOT LOWER THAN REFERENCE VALUE B

· DETAILS
CONTROL IN ACCORDANCE WITH FOLLOWING TABLE

|  | MODE REQUESTED FOR OPPOSITE WHEEL | | |
|---|---|---|---|
| MODE REQUESTED FOR OBJECT WHEEL | PD MODE | PH MODE | PI MODE *1 |
| PD MODE | — / —*2 | — / PD | — / PD |
| PH MODE | PD / —*3 | — / — | — / — |
| PI MODE *1 | PD / — | — / — | — / — |

*1: PI MODE INCLUDES CONTINUOUS AND PULSE PI MODES

*2: (OUTPUT MODE FOR OBJECT WHEEL) / (OUTPUT MODE FOR OPPOSITE WHEEL)

*3: " — " MEANS THAT REQUESTED MODE IS OUTPUT WITHOUT CHANGE

· TERMINATING CONDITION

OR
- BEFORE ANTI-LOCK CONTROL
- VEHICLE DECELERATION LOWER THAN REFERENCE VALUE B

APPARATUS FOR CONTROLLING DIFFERENCES IN BRAKING TORQUE BETWEEN LEFT AND RIGHT WHEELS OF VEHICLE

BACKGROUND OF THE INVENTION

1. Field of the Invention

The present invention relates to an anti-lock control apparatus for a motor vehicle and particularly to the art of controlling the difference between respective braking torques applied to a right and a left wheel of the vehicle.

2. Related Art Statement

It is widely practiced to provide a motor vehicle with an anti-lock control apparatus for not only shortening the braking distance needed to brake and stop the vehicle running on a road surface but also improving the stability of the running direction of the vehicle when the vehicle is braked. Generally, an anti-lock control apparatus controls respective braking torques applied to a left and a right wheel of a vehicle and thereby prevents each wheel from being locked on a road surface.

An example of the anti-lock control apparatus is disclosed in Japanese Patent Application laid open for inspection under Publication No. 62(1987)-275870. The prior apparatus can perform (a) a normal control in which respective braking torques applied to two front (left and right) wheels of a four-wheel vehicle are controlled, independent of each other, based on respective lock tendencies of the two wheels, and (b) a low-select control in which the respective braking torques applied to the two front wheels are controlled in a common manner based on the higher one of the respective lock tendencies of the two wheels. More specifically described, if an anti-lock control is started when the running speed of the vehicle is not lower than a reference value, the low-select control is selected commonly for the two front wheels and is performed for a predetermined initial period of the anti-lock control and subsequently the normal control is selected and performed for each of the two front wheels, independent of each other.

The prior apparatus performs the low-select control commonly for the two front wheels, when the above-indicated initiating conditions are satisfied, irrespective of whether the deceleration of the vehicle is high or low when the vehicle is braked. However, the degree of necessity to perform the low-select control for the front wheels changes depending upon the vehicle deceleration.

When a four-wheel vehicle is subjected to a deceleration, the vehicle is subjected to a forward load movement, so that vertical loads exerted to front wheels of the vehicle increase and vertical loads exerted to rear wheels of the vehicle decrease. Consequently lateral forces exerted to respective tires of the rear wheels decrease. The amount of forward load movement increases as the vehicle deceleration increases. The vehicle deceleration increases as friction coefficient, $\mu$, of road surface on which the vehicle is running increases. As shown in FIG. 6, when a difference is produced between respective braking torques applied to the front left and right wheels, the vehicle is subjected to a yawing moment, M, due to the torque difference. The change of the running direction of the vehicle due to the yawing moment M cannot be avoided unless the lateral forces which can stand the yawing moment M are exerted to the tires of the rear wheels.

However, when the vehicle deceleration becomes high because the vehicle is strongly braked on a road surface having a high friction coefficient $\mu$, the amount of forward load movement becomes large, so that the vertical loads exerted to the rear wheels become low and the lateral forces exerted to the rear wheels also become low. In this case, if the above-identified prior apparatus selects and performs the low-select control for decreasing the difference between the respective braking torques applied to the front left and right wheels, the yawing moment M due to the torque difference becomes low. Consequently the stability of the running direction of the vehicle is maintained in spite of the low lateral forces exerted to the tires of the rear wheels. Thus, when the vehicle deceleration is high, the necessity to maintain the stability of the vehicle's running direction is high and the necessity to perform the front-wheel low-select control is also high.

In contrast, when the vehicle deceleration remains low because the vehicle is braked on a road surface having a low friction coefficient $\mu$, the amount of forward load movement is small, so that the vertical loads exerted to the rear wheels remains sufficiently high and the lateral forces exerted to the rear wheels also remains high. In this case, even if the above-identified prior apparatus does not perform the low-select control for the front wheels, the stability of the running direction of the vehicle is maintained. Accordingly, there remains a possibility that the respective braking torques applied to the front wheels be increased for shortening the braking distance. Thus, when the vehicle deceleration is low, the necessity to maintain the stability of the vehicle's running direction is lower than when the vehicle deceleration is high, therefore the necessity to perform the front-wheel low-select control is also lower.

While the above discussion is made for the low-select control performed for the front left and right wheels, the following discussion is made for the low-select control performed for the rear left and right wheels:

Generally, when the low-select control is performed for the rear left and right wheels, the slip ratios of the rear wheels becomes lower than when the normal control is performed, and the lateral forces exerted to the tires of the rear wheels become high. In contrast, when the normal control is performed for the rear wheels, the slip ratios of the rear wheels becomes higher than when the low-select control is performed, and the braking forces applied to the rear wheels become high. Therefore, when the vehicle deceleration is high because the vehicle is braked on a road surface having a high friction coefficient $\mu$ and accordingly the vertical loads exerted to the rear wheels become low, it is advantageous for the prior apparatus to select and perform the low-select control for the rear wheels, for maintaining the stability of the running direction of the vehicle. In contrast, when the vehicle deceleration is low because the vehicle is braked on a road surface having a low friction coefficient $\mu$ and the vertical loads exerted to the rear wheels remains sufficiently high, it is advantageous for the prior apparatus to select and perform the normal control for the rear wheels, for shortening the braking distance.

Thus, irrespective of whichever the low-select control is performed for, the front wheels or the rear wheels, it is advantageous for the prior apparatus to select and perform the low-select control when the vehicle deceleration is high, and not to select the low-select control when the vehicle deceleration is low, for the purpose of improving its vehicle-braking performance including shortening the vehicle-braking distance and maintaining the stability of vehicle's running direction.

SUMMARY OF THE INVENTION

It is therefore an object of the present invention to provide an anti-lock control apparatus which exhibits improved vehicle-braking performance irrespective of whether vehicle's deceleration is high or low.

According to a first aspect of the present invention, there is provided an apparatus for controlling a left-wheel and a right-wheel braking torque applied to a left and a right wheel of a motor vehicle running on a road surface, respectively, when the vehicle is braked, comprising a torque changing device which changes each of the left-wheel and right-wheel braking torques, and a controller which controls, in an anti-lock control mode thereof, the torque changing device to prevent each of the left and right wheels from being locked on the road surface, the controller comprising torque-difference control means for controlling the torque changing device to change at least one of the left-wheel and right-wheel braking torques such that a difference between the left-wheel and right-wheel braking torques is smaller when a deceleration of the vehicle is higher than a threshold value than when the deceleration is not higher than the threshold value.

In the anti-lock control apparatus in accordance with the first aspect of the invention, the torque-difference control means controls the torque changing device to change the left-wheel and/or right-wheel braking torques such that the difference between the left-wheel and right-wheel braking torques is smaller when the vehicle deceleration is higher than a threshold value than when the deceleration is not higher than the threshold value. Therefore, the present apparatus contributes to not only maintaining the direction stability of the vehicle when the vehicle deceleration is high but also shortening the braking distance of the vehicle when the vehicle deceleration is low. The left and right wheels of the vehicle may be a front left and a front right wheel of a four-wheel vehicle, a rear left and a front right wheel of a four-wheel vehicle, or a front and a rear left wheel and a front and a rear right wheel of a four-wheel vehicle. In the case where the vehicle is a four-wheel vehicle having a diagonal-type two-way braking system, the left and right wheels of the vehicle may be a front left and a rear right wheel, and/or a front right and a rear left wheel, of the four-wheel vehicle. A braking torque applied to a wheel may be changed by changing the fluid pressure (working fluid may be a liquid or a gas) of a brake cylinder which operates a brake device for reducing the rotation of the wheel. Alternatively, a braking torque may be changed by changing an electric current or voltage applied to an electric motor which operates a brake device. Otherwise, a braking torque may be changed by changing a regenerative power which is produced, when the vehicle is braked, in an electric motor which drives the left and right wheels upon application of an electric power thereto. The vehicle deceleration may be detected by an exclusive deceleration-detecting device such as a G switch or a G sensor. Alternatively, the deceleration may be obtained as the time derivative of the running speed of the vehicle estimated based on the respective rotation speeds of two or more wheels of the vehicle. Otherwise, the deceleration may be indirectly determined based on one or more parameters of the vehicle which relate to the deceleration; such as driver's force used to operate the brake pedal, brake pressure, pitching angle of vehicle's body, vertical load exerted to each wheel, etc.

According to a preferred feature of the first aspect of the invention, the controller further comprises normal control means for controlling the torque changing device to change the at least one of the left-wheel and right-wheel braking torques, so that the each of the left and right wheels is prevented from being locked on the road surface, and special control means for controlling the torque changing device to change the at least one of the left-wheel and right-wheel braking torques such that the difference between the left-wheel and right-wheel braking torques when the special control means controls the torque changing device is smaller than the difference between the left-wheel and right-wheel braking torques when the normal control means controls the torque changing device, so that the each of the left and right wheels is prevented from being locked on the road surface, and the torque-difference control means comprises selecting means for, when the deceleration of the vehicle is higher than the threshold value, selecting the special control means for controlling the torque changing device, and inhibiting the normal control means from controlling the torque changing device and, when the deceleration is not higher than the threshold value, selecting the normal control means for controlling the torque changing device, and inhibiting the special control means from controlling the torque changing device. In the case where vehicle deceleration is high and lateral forces exerted to tires of rear wheels of a four-wheel vehicle are low, so that the demand to maintain the direction stability of the vehicle is strong, the selecting means inhibits the normal control which permits the difference between the left-wheel and right-wheel braking torques to be greater than that permitted by the special control. On the other hand, in the case where the vehicle deceleration is low and the lateral forces exerted to the tires of the rear wheels are high, so that the demand to maintain the direction stability of the vehicle is not stronger than when the deceleration is high, the selecting means inhibits the special control which limits the generation of the difference between the left-wheel and right-wheel braking torques. The normal control may be an independent control in which one of a plurality of torque control modes is selected based on a lock tendency of each one of the left and right wheels, independent of the other wheel, and the braking torque applied to each wheel is controlled in the selected torque control mode. The special control may be a common control in which the left-wheel and right-wheel braking torques are controlled in a common torque control mode. The common control may be the previously-described low-select control. The low-select control may be of a type in which one of left and right wheels which is identified as a locking wheel earlier than the other wheel and is used as a reference wheel for determining a characteristic of the current torque control, continues to be used as the reference wheel throughout a certain anti-lock control operation. Otherwise, the low-select control may be of a type in which the normal control is virtually performed to select appropriate torque control modes for the left and right wheels, respectively, and, if the selected modes are different from each other, one of the two modes which permits a more torque increase than the other mode is changed to the same mode as the other mode. As far as the present invention is concerned, any torque increase is defined as a more torque increase than no torque change or any torque decrease, and no torque change is defined as a more torque increase than any torque decrease. In addition, a greater torque increase is defined as a more torque increase than a smaller torque increase. In the latter case, when only one of the left and right wheels is found as a locking wheel and an anti-lock control operation is initiated for the locking wheel only, the other wheel is not subjected to any anti-lock control during at least the initial period of the anti-lock control operation. That is, during the initial period, no torque control mode is selected for the other wheel. However, driver's intention permits the braking torque applied to the other wheel to be increased. Thus, it can be said that a torque-increase mode has been selected for the other wheel.

Therefore, if in the initial period the low-select mode is performed, the braking torque applied to the other wheel is controlled in the same control mode as that selected for the locking wheel.

According to another feature of the first aspect of the invention, the normal control means comprises independent control means for selecting one of a plurality of torque control modes, based on a parameter relating to a lock tendency of each one of the left and right wheels, independent of the other wheel, and controlling, in the selected torque control mode, the torque changing device to change a corresponding one of the left-wheel and right-wheel braking torques, independent of the other braking torque, the plurality of torque control modes comprising a torque-increase preventing mode in which the torque changing device prevents each one of the left-wheel and right-wheel braking torques from being increased, and the special control means comprises first control means for virtually operating the independent control means to select the one torque control mode based on the parameter relating to the lock tendency of the each of the left and right wheels and, when different ones of the plurality of torque control modes are selected for the left and right wheels, respectively, and simultaneously when one of the selected torque control modes is the torque-increase preventing mode, controlling the torque changing device to change, in the torque-increase preventing mode, a corresponding one of the left-wheel and right-wheel braking torques and change the other braking torque in one of the plurality of torque control modes in which the torque changing device is permitted to change the other braking torque to a value smaller than a value to which the other braking torque would be changed by the torque changing device in the other selected torque control mode. As mentioned above, the special control may be the low-select control, and the low-select control may be of the type in which the normal control is virtually performed to select respective appropriate control modes for the left and right wheels and, if the selected two modes are different from each other, one of the two modes which permits a more torque increase than the other mode is changed to the same mode as the other mode. Accordingly, in the case where in the normal control a torque increasing mode would be selected as the torque control mode, in the special control the torque increasing mode is changed to a torque holding mode or a torque decreasing mode. Thus, the low-select control is one of different types of special controls which has a high tendency to decrease the braking force applied to each one of the left and right wheels. Meanwhile, in the case where a torque decreasing and a torque increasing mode are selected and used for a left and a right wheel, or in the case where a torque decreasing and a torque holding mode are selected and used for a left and a right wheel, the difference between respective braking torques applied to the two wheels may be increased as a result of the anti-lock control under the selected modes. This difference may be increased also in the case where a torque increasing and a torque holding mode are selected and output for a left and a right wheel. In the third case, however, if one of the left-wheel and right-wheel braking torques is controlled in a torque decreasing mode in place of the mode virtually selected therefor, the sum of respective braking forces applied to the two wheels may be reduced excessively largely.

Hence, according to another feature of the first aspect of the invention, the torque-increase preventing mode may comprise a torque decreasing mode in which the torque changing device is permitted to decrease each one of the left-wheel and right-wheel braking torques. According to this feature, one of the two selected modes which permits a more torque increase as defined above than the other mode is not changed to a different mode which permits a less torque increase, in all cases in which the two modes are different from each other. Only in the case where the two selected modes includes a torque decreasing mode, the above one selected mode is changed to the above different mode. Thus, this type of special control has a lower tendency to reduce the sum of respective braking forces applied to the left and right wheels, than the low-select control, and contributes to shortening the braking distance needed to brake and stop the vehicle. In the case where the torque changing device is operable in each of a torque increasing mode, a torque holding mode, and a torque decreasing mode, the torque increasing mode virtually selected by the independent control means may be changed to the torque decreasing mode or the torque holding mode by the first control means. In addition, in the case where the torque changing device is operable in each of a quick torque increasing mode and a slow torque increasing mode, the quick torque increasing mode virtually selected by the independent control means may be changed to the slow torque increasing mode by the first control means. In short, in the special control, a torque control mode which is virtually or provisionally selected by the independent control means may be changed to a different torque control mode which permits a less torque increase as defined above than that permitted by the selected mode.

According to another feature of the first aspect of the invention, the special control means comprises second control means for virtually operating the independent control means to select the one torque control mode based on the parameter relating to the lock tendency of the each of the left and right wheels and, when different ones of the plurality of torque control modes are selected for the left and right wheels, respectively, and simultaneously when one of the selected torque control modes is the torque-increase preventing mode, controlling the torque changing device to change, in the torque-increase preventing mode, each of the left-wheel and right-wheel braking torques.

According to another feature of the first aspect of the invention, the selecting means comprises means for, when the deceleration of the vehicle is higher than a first threshold value as the threshold value in an initial period of the operation of the controller in the anti-lock control mode, selecting the second control means for controlling the torque changing device and inhibiting each of the independent control means and the first control means from operating the torque changing device; when the deceleration is higher than the first threshold value and is not higher than a second threshold value higher than the first threshold value after the initial period, selecting the independent control means for controlling the torque changing device and inhibiting each of the first and second control means from operating the torque changing device; and, when the deceleration is higher than the second threshold value higher than the first threshold value after the initial period, selecting the first control means for controlling the torque changing device and inhibiting each of the independent and second control means from operating the torque changing device.

According to another feature of the first aspect of the invention, the controller further comprises means for terminating the operation of the second control means when the second control means has continued to control the torque changing device for more than a first reference time.

According to another feature of the first aspect of the invention, the controller further comprises means for terminating the operation of the first control means when the deceleration of the vehicle has decreased down to lower than the second threshold value.

According to another feature of the first aspect of the invention, the controller further comprises means for terminating the operation of the first control means when the first control means has continued controlling the torque changing device for more than a second reference time and initiating the operation of the independent control means to change the other braking torque in the other selected torque control mode.

According to another feature of the first aspect of the invention, the motor vehicle includes a front left wheel, a front right wheel, a rear left wheel, and a rear right wheel, and wherein the left and right wheels of the vehicle comprise the front left and right wheels.

According to a second aspect of the present invention, there is provided an apparatus for controlling a left-wheel and a right-wheel braking torque applied to a left and a right wheel of a motor vehicle running on a road surface, respectively, when the vehicle is braked, comprising a torque changing device which changes each of the left-wheel and right-wheel braking torques, and a controller which controls, in an anti-lock control mode thereof, the torque changing device to prevent each of the left and right wheels from being locked on the road surface, the controller comprising control means for, (a) when different ones of a plurality of torque control modes comprising a torque decreasing mode in which the torque changing device is permitted to decrease each one of the left-wheel and right-wheel braking torques, are selected based on respective parameters relating to respective lock tendencies of the left and right wheels, independent of each other, and (b) when one of the different torque control modes which is selected for a corresponding one of the left and right wheels is the torque decreasing mode, controlling the torque changing device to change a corresponding one of the left-wheel and right-wheel braking torques in the torque decreasing mode and change the other braking torque in one of the plurality of torque control modes in which the torque changing device is permitted to change the other braking torque to a value smaller than a value to which the other braking torque would be changed by the torque changing device in the other of the different torque control modes selected for the other of the left and right wheels.

In the anti-lock control apparatus in accordance with the second aspect of the invention, one of the two selected modes which permits a more torque increase as defined above than the other mode is not changed to a different mode which permits a less torque increase, in all cases in which the two modes are different from each other. Only in the case where the two selected modes includes a torque decreasing mode, the above one selected mode is changed to the above different mode. Thus, this torque control enjoys a lower tendency to reduce the sum of braking forces applied to the left and right wheels, than the low-select control, and contributes to shortening the vehicle braking distance.

According to a preferred feature of the second aspect of the invention, the controller further comprises mode selecting means for selecting the one of the plurality of torque control modes based on the parameter relating to the lock tendency of the each one of the left and right wheels, independent of the other wheel.

BRIEF DESCRIPTION OF THE DRAWINGS

The above and optional objects, features, and advantages of the present invention will be better understood by reading the following detailed description of the preferred embodiments of the invention when considered in conjunction with accompanying drawings, in which:

FIG. 2 is a view for explaining a front-wheel low-select control performed by a control unit of the braking system of FIG. 1;

FIG. 3 is a view for explaining a front-wheel mode-change control carried out by the control unit of the braking system of FIG. 1;

DETAILED DESCRIPTION OF THE PREFERRED EMBODIMENTS

Figure 1:
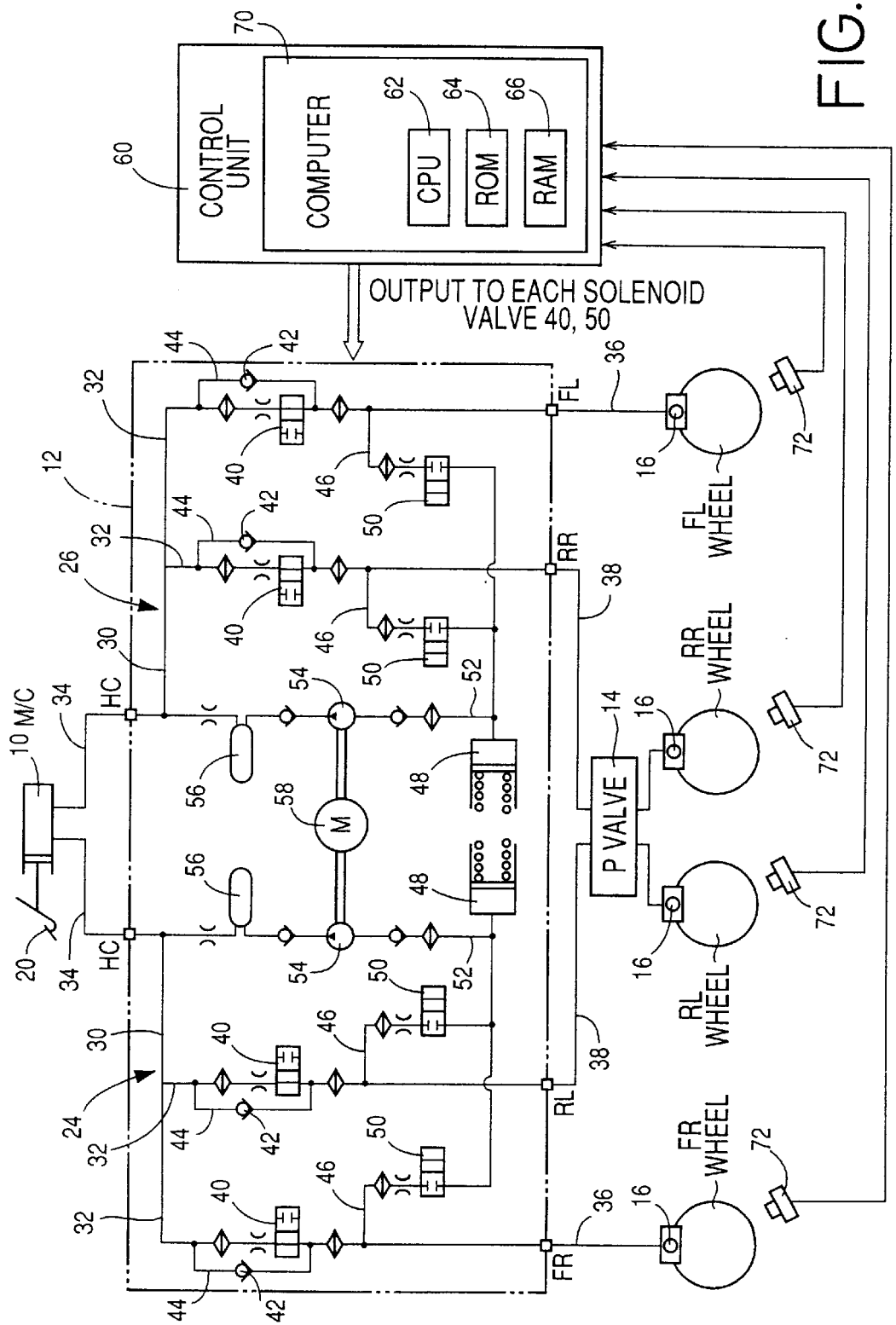
FIG. 1 is a diagrammatic view of an anti-lock braking system including an anti-lock control apparatus to which the present invention is applied.

Referring to the drawings, there will be described an anti-lock braking system including an anti-lock control apparatus to which the present invention is applied.

The present braking system is a diagonal two-way braking system for a four-wheel motor vehicle. As shown in FIG. 1, the braking system includes a master cylinder (M/C) 10 which is connected to four brake cylinders 16 via a brake unit 12 and a proportioning ("P") valve 14.

The master cylinder 10 is a tandem cylinder in which two independent pressure chambers are provided in series. When a brake pedal 20 functioning as a brake-system operating member is pressed by a driver's foot, an identical fluid pressure corresponding to the driver's pressing force applied to the pedal 20 is mechanically produced in each of the two pressure chambers of the master cylinder 10.

The brake unit 12 includes a first and a second main passage 24, 26 which are independent of each other. The first main passage 24 connects between one of the two pressure chambers of the master cylinder 10 and the two brake cylinders 16 associated with a front right wheel, FR, and a rear left wheel, RL. The second main passage 26 connects between the other pressure chamber of the master cylinder 10 and the two brake cylinders 16 associated with a front left wheel, FL, and a rear right wheel, RR.

The first main passage 24 includes a trunk passage 30 and two branch passages 32 bifurcated from the trunk passage 30. The trunk passage 30 is connected via a piping 34 to one pressure chamber of the master cylinder 10. The two branch passages 32 are connected via respective pipings 36, 38 to the respective brake cylinders 16 for the two wheels FR, RL.

A first solenoid valve 40 which is normally open is provided in each of the branch passages 32, and normally permits the fluid pressure of the master cylinder 10 to be transmitted to the brake cylinders 16 for the wheels FR, RL.

A return passage 44 which is provided with a check valve 42 and which bypasses the solenoid valve 40 is also provided in each of the branch passages 32. A reservoir passage 46 is connected at one end thereof to each branch passage 32 at a point intermediate between each solenoid valve 40 and a corresponding brake cylinder 16 and is connected at the other end thereof to a reservoir 48. A second solenoid valve 50 which is normally closed is provided in each of the reservoir passages 46, and normally prevents the brake fluid from being discharged from a corresponding brake cylinder 16 to the reservoir 48.

A pump passage 52 is connected at one end thereof to a joined reservoir passage 46 and is connected at the other end thereof to the master cylinder 10. A pump 54 and a damper 56 are provided in the pump passage 52. The pump 54 pumps up the brake fluid from the reservoir 48 and returns it to the master cylinder 10. The damper 56 damps the pulsation of brake fluid caused by the pump 54.

The second main passage 26 has the same construction as the above-described construction of the first main passage 24. The same reference numerals as used for the various elements associated with the first main passage 24 are used to designate the corresponding elements of the second main passage 26, and the description thereof is omitted. However, the two pumps 54 provided for the two brake-pressure ways 24, 26 are driven by a common electric motor 58.

The P (proportioning) valve 14 is provided in the two pipings 38 which connect between the brake unit 12 and the respective brake cylinders 16 for the two rear wheels RL, RR. When the fluid pressure of the master cylinder 10 is not higher than a threshold value, the P valve 14 transmits the fluid pressure to each cylinder 16 without modifying it. On the other hand, when the fluid pressure of the master cylinder 10 is higher than the threshold value, the P valve 14 transmits decreased fluid pressures to the two cylinders 16, respectively. The P valve 14 includes two valves which can decrease the fluid pressure independently of each other, and a common housing in which the two valves are accommodated.

The respective solenoids of the first and second solenoid valves 40, 50 are connected to the control unit 60. The control unit 60 is essentially provided by a computer 70 including a central processing unit (CPU) 62, a read only memory (ROM) 64, and a random access memory (RAM) 66. Four wheel-speed sensors 72 which measure respective peripheral speeds of the four wheels FR, RL, RR, FL are also connected to the control unit 60. The control unit 60 controls the first and second solenoid valves 40, 50, based on detection signals supplied from the four sensors 72. When the driver's foot presses the brake pedal 20, the control unit 60 controls, via the solenoid valves 40, 50, the brake pressure applied to each wheel FR, RL, RR, FL, such that each wheel is effectively prevented from being locked on a road surface on which the vehicle is running.

In the present embodiment, the first and second solenoid valves 40, 50, the wheel-speed sensors 72, and the control unit 60 cooperate with one another to provide the anti-lock control apparatus. The anti-lock control apparatus performs, as the normal control, an independent control in which the control unit 60 controls, based on a lock tendency of each of the four wheels FR, RL, RR, FL, the brake pressure applied to that wheel, independent of the control of the other brake pressures applied to the other wheels. However, if at the beginning of each anti-lock control operation a deceleration of the vehicle's body is not lower than a first reference value, A, (e.g., 0.6 [g]), the control unit 60 performs, for the front left and right wheels FL, FR, a low-select control as a first type of special control, i.e., left-and-right-wheel torque-difference limiting control. If the deceleration of the vehicle's body exceeds a second reference value, B, (e.g., 0.8 [g]) higher than the first reference value A, the control unit 60 performs, for the two front wheels FL, FR, a mode-change control as a second type of special control. For the rear wheels RL, RR, the control unit 60 always performs the same low-select control as that performed for the front wheels FL, FR, in each anti-lock control operation. However, for the rear wheels, it is possible to perform the independent control in place of the low-select control.

Next, there will be described an initiating and a terminating condition, and details, of the front-wheel low-select control.

(1) Initiating Condition

As shown in FIG. 2, the low-select control is initiated when the following three conditions are simultaneously satisfied: the first condition is that the current fluid-pressure control period is the initial pressure-decrease control period in the current anti-lock control operation; the second condition is that the current running speed of the vehicle's body is not lower than a reference value; and the third condition is that the current deceleration of the vehicle's body is not lower than the first reference value A.

In the present embodiment, each anti-lock control operation includes repetitive unit pressure control periods each of which includes a single pressure-decrease control period and a single pressure-increase control period. In each unit pressure control period, the pressure-decrease control period precedes the pressure-increase control period. Thus, the above-indicated first condition means that the current fluid-pressure control period is the pressure-decrease control period of the first or initial unit pressure control period, that is, the first or initial pressure-decrease control period in the current anti-lock control operation.

The above-indicated second condition is provided because no reliable anti-lock control operation can be performed before it is judged that the wheel-speed sensors 72 are supplying accurate signals to the control unit 60. For making this judgment, it is required that the running speed of the vehicle's body be higher than a certain reference value. This reference value is, e.g., 30 km/h. Since the second condition is not essential according to the principle of the present invention, it may be omitted.

(2) Details

In the low-select control, the respective brake pressures applied to the front left and right wheels FL, FR are controlled in a common mode determined based on a current lock tendency of one of the two front wheels FL, FR which is higher than that of the other wheel. More specifically described, first, the control unit 60 selects, for each of the two front wheels FL, FR, an appropriate one of a pressure-increase ("PI") mode, a pressure-hold ("PH") mode, and a pressure-decrease ("PD") mode which are employed in the above-described independent control, based on the current lock tendency of each of the front wheels FL, FR, assuming that the current anti-lock control operation is under the independent control. Then, the control units 60 compares the two control modes selected for the two front wheels FL, FR, with each other, and selects one of the two modes which has a lower pressure-change level or degree than that of the other mode. As far as the present invention is concerned, the pressure-change level of the PH mode is defined as being lower than that of the PI mode and higher than that of the PD mode. For example, if in the assumed independent control the PI mode is selected for one of the front wheels FL, FR and the PD mode is selected for the other, then, the control unit 60 selects, in the low-select control, the PD mode commonly for the two wheels FL, FR, so that an identical braking torque is applied to each of the front wheels FL, FR and the difference between the respective braking forces applied to the front wheels FL, FR is minimized.

In the present embodiment, the PI mode includes a quick or "continuous" PI mode in which each first solenoid valve 40 is continuously held in a PI state thereof, and a slow or "pulse" PI mode (i.e., intermittent PI mode) in which each valve 40 is alternately switched to the PI state and a PD state thereof in response to pulse signals supplied from the control unit 60. As far as the present embodiment is concerned, the continuous and pulse PI modes each as a PI mode are defined as having an equal pressure-change level. However, it is possible to define the continuous and pulse increase modes such that the continuous PI mode has a pressure-change level higher than that of the pulse PI mode.

When the pressing of the driver's foot on the brake pedal 20 is started, an initial period may be observed in which only one of the front wheels FL, FR exhibits an excessively high lock tendency and an anti-lock control operation is started for that one front wheel only. In this initial period, no control mode is selected for the other front wheel. However, since the driver's intention permits an increased braking torque to be applied to the other wheel, it can be said that the PI mode has been selected for the other wheel. Therefore, when in the initial period the low-select control is performed for the two front wheels FL, FR, the same control mode as that requested for one of the two wheels is selected for the other wheel.

(3) Terminating Condition

As shown in FIG. 2, the low-select control is terminated when either one of the following two conditions is satisfied: the first condition is that in the independent control the PI mode would be selected for each of the two front wheels FL, FR; and the second condition is that the current low-select control has been continued for more than a reference time, $T_1$ (sec).

Next, there will be described an initiating and a terminating condition, and details, of the front-wheel mode-change control.

(1) Initiating Condition

As shown in FIG. 3, the mode-change control is initiated when both of the following two conditions are satisfied; the first condition is that an anti-lock control operation is being performed for one or both of the two front wheels FL, FR; and the second condition is that the vehicle deceleration is not lower than the second reference value B.

(2) Details

Assuming that the independent control has been selected, the control unit 60 initially determines a control mode requested for each of the two wheels FL, FR. If the PD mode is requested for only one of the two wheels, the control unit 60 does not change the PD mode and change the control mode initially determined for the other wheel, to a lower pressure-change-level mode in which the brake pressure will be lower than will be in the initially determined mode.

The details of the mode-change control are summarized in a table shown in FIG. 3. In the table, the "object" wheel is one of the two wheels which is being focused, and the "opposite" wheel is the other of the two wheels. The PD, PH, and PI modes are modes which would be selected or requested in the independent control.

In the case where in the independent control the PD mode would be requested for the opposite wheel, the PD mode which in the independent control would be requested for the object wheel is not changed and is finally adopted for the object wheel; and in the case where the PH or PI mode which in the independent control would be requested for the object wheel is changed to a lower pressure-change-level mode, i.e., PD mode, which is finally adopted for the object wheel. In the case where in the independent control the PH or PI mode would be requested for the opposite wheel, any of the PD, PH, and PI modes which in the independent control would be requested for the object wheel is not changed and is finally adopted for the object wheel.

The above description relating to the changing of the mode initially requested for the object wheel can apply to the opposite wheel, as shown in the table of FIG. 3.

(3) Terminating Condition

As shown in FIG. 3, the mode-change control is terminated when either one of the following two conditions is satisfied; the first condition is that it is after an anti-lock control operation is terminated and before another anti-lock control operation is initiated; and the second condition is that the vehicle deceleration is lower than the second reference value B.

If the mode-change control is continued till the first or second condition is satisfied, then it may be possible that the brake pressure being applied to one wheel under the anti-lock control in the lower pressure-change-level mode which has been changed in the mode-change control from the higher pressure-change-level mode which would be selected in the independent control, may be decreased excessively largely. On the other hand, when the current mode-change control is terminated and simultaneously the independent control is initiated, the higher pressure-change-level mode is selected and output. Since the higher pressure-change-level mode cannot be the PD mode, no further decreasing of the brake pressure being applied to the wheel in question is continued.

Hence, in the present embodiment, the mode-change control is carried out in such a way that the lower pressure-change-level mode which has been changed from the higher pressure-change-level mode which would be selected in the independent control, is continued for a short reference time, $T_2$, and subsequently is changed back to the higher pressure-change-level mode. Thus, the mode-change control is not continued for more than the reference time $T_2$.

The above-described anti-lock control is carried out according to various routines pre-stored in the ROM 64. Those routines include a wheel-speed calculating routine, a vehicle-speed estimating routine, an anti-lock-control-initiation judging routine, and an anti-lock-control performing routine.

The wheel-speed calculating routine is carried out at a regular interval of time, so as to calculate the speed of rotation of each wheel 16 based on the signal supplied from a corresponding wheel-speed sensor 72.

The vehicle-speed estimating routine is carried out at a regular interval of time, so as to estimate the running speed of the vehicle's body based-on the respective rotation speeds of the four wheels FL, FR, RL, RR.

The anti-lock-control-initiation judging routine is carried out for each of the four wheels FL, FR, RL, RR, so as to judge whether each wheel exhibits an excessively large lock tendency, based on a relationship between the calculated rotation speed of each wheel and the estimated running speed of the vehicle. However, since in the present embodiment the principle of the present invention is applied to the anti-lock control of the front wheels FL, FR only, the following description relates to only the front wheels and the description relating to the rear wheels is omitted. If a positive judgment is made for either one of the front wheels, the control unit 60 carries out the anti-lock-control performing routine represented by the flow chart of FIG. 4.

The anti-lock-control performing routine is carried out for each of the front wheels FL, FR, so as to select an appropriate one of the independent control, the low-select control, and the mode-change control, based on given conditions.

Figure 4:
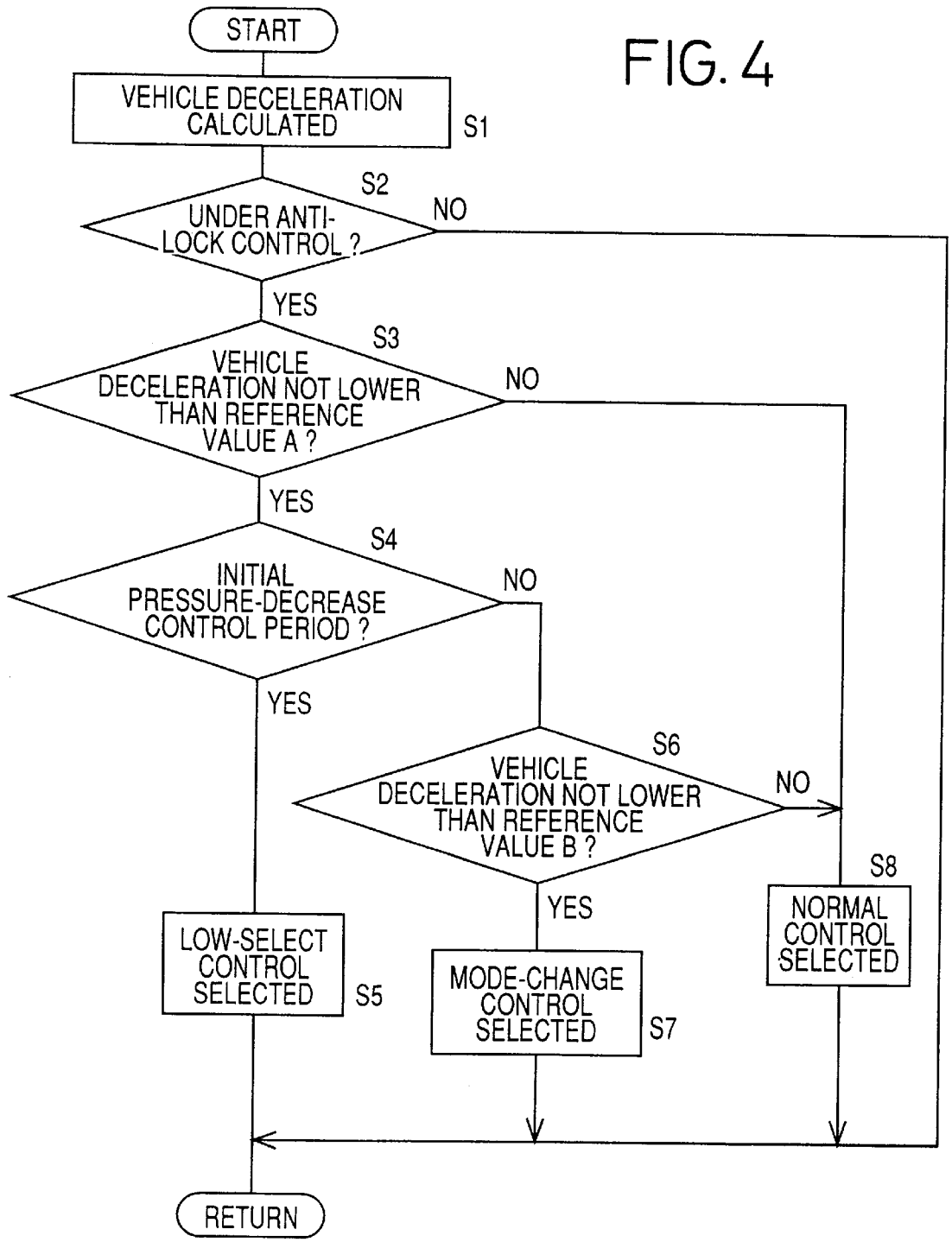
FIG. 4 is a flow chart representing an anti-lock control routine according to which the control unit of the braking system of FIG. 1 operates for selectively performing the front-wheel low-select control, the front-wheel mode-change control, and a front-wheel normal control.

The anti-lock control performing routine of FIG. 4 is carried out in repetitive control cycles. In each control cycle in accordance with the routine of FIG. 4, first, at Step S1, the CPU 62 of the control unit 60 calculates the deceleration of vehicle's body based on the difference between two running speeds of vehicle's body estimated in two successive (current and prior) control cycles in accordance with the vehicle-speed estimating routine. Step S1 is followed by Step S2 to judge whether one or both of the front wheels FL, FR is now under the anti-lock control in accordance with the routine of FIG. 4. If a negative judgment is made at Step S2, the current control cycle in accordance with the routine of FIG. 4 is terminated. On the other hand, if a positive judgment is made at Step S2, the control of the CPU 62 goes to Step S3 and the following steps.

At Step S3, the CPU 62 judges whether the vehicle deceleration calculated at Step S1 is not lower than the first reference value A. Assuming that the vehicle deceleration is higher than the reference value A because the driver has strongly pressed the brake pedal 20 on a road surface having a high friction coefficient, $\mu$, a positive judgment is made at Step S3, and the control of the CPU 62 goes to Step S4. At Step S4, the CPU 62 judges whether either one of the front wheels FL, FR is now in the initial pressure-decrease control period of the current anti-lock control operation. If a positive judgment is made at Step S4, the control of the CPU 62 goes to Step S5 to select the low-select control for the two wheels FL, FR, and the current control cycle is terminated. During the initial period of the anti-lock control operation, the other wheel does not exhibit an excessively large lock tendency. However, the decreasing of the brake pressure being applied to the other wheel may be started to comply with the PD control requested for the one wheel. Thus, the respective brake pressures being applied to the two front wheels FL, FR are made equal to each other, so that the vehicle is prevented from being subjected to a yawing moment which would otherwise change the running direction of the vehicle. Consequently the running stability of the vehicle that tends to be lowered during the initial period in the anti-lock control operation, is not lowered. Thus, the braking performance of the vehicle is improved.

Figure 5:
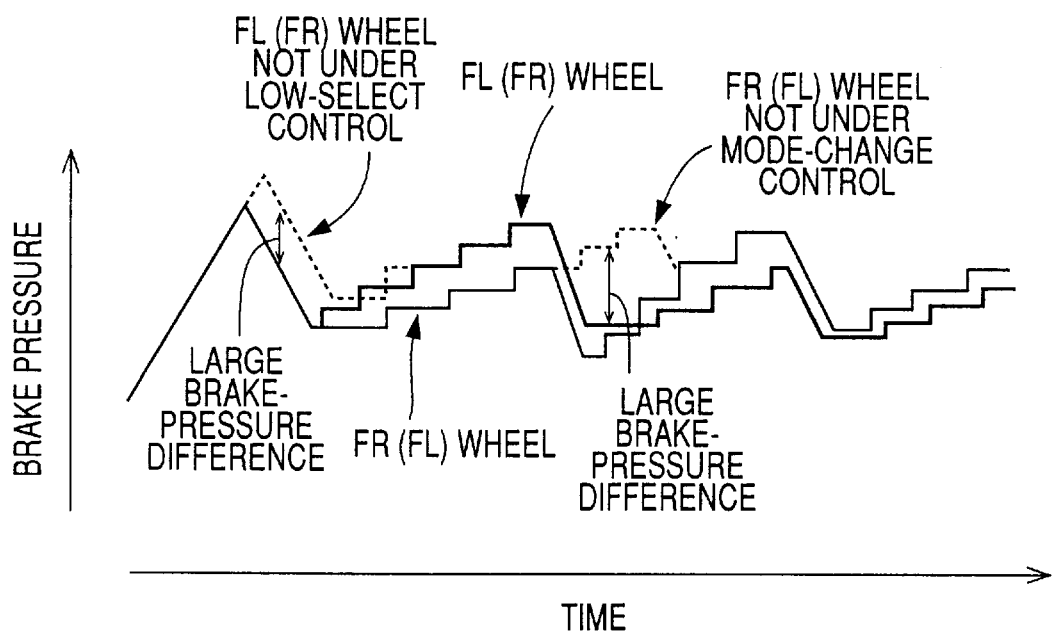
FIG. 5 is a time chart showing an example of a time-wise change of respective brake pressures applied to a front left (FL) wheel and a front right (FR) wheel of a four-wheel vehicle under control of the control unit of the braking system of FIG. 1 according to the control routine represented by the flow chart of FIG. 4.
Figure 6:
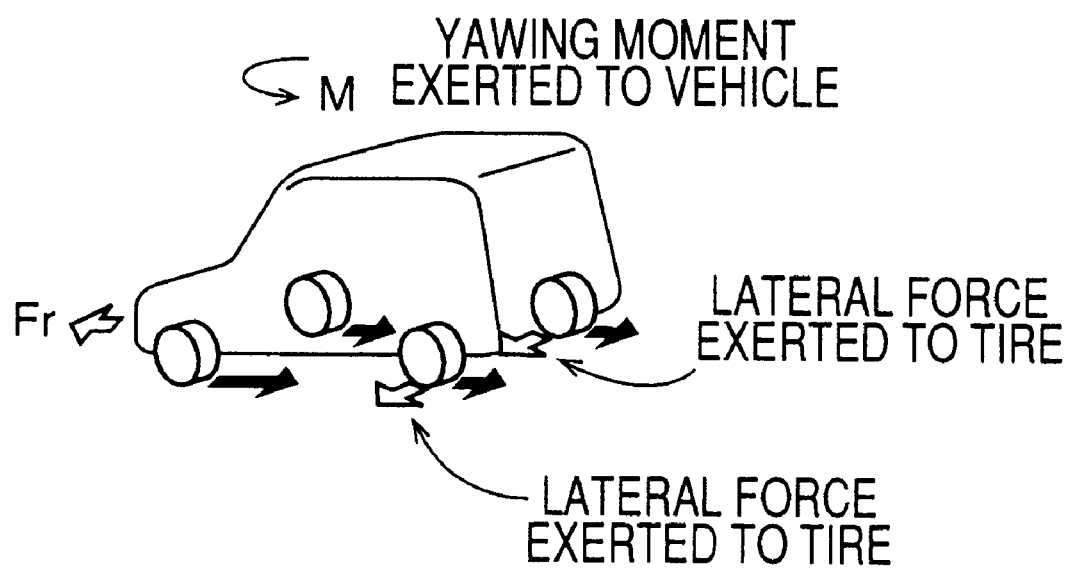
FIG. 6 is a view for explaining a relationship among the difference between respective braking forces applied to the front left and right wheels, respective lateral forces exerted to a rear left wheel and a rear right wheel of the vehicle, and a yawing moment exerted to the vehicle.

The low-select control is terminated when the first or second terminating condition therefor is satisfied. Assuming that the routine of FIG. 4 is started again after the initial PD control period and that the current vehicle deceleration is not lower than the first reference value A and is lower than the second reference value B, a positive judgment is made at each of Steps S2 and S3 and a negative judgment is made at each of Steps S4 and S6, so that the control of the CPU 62 goes to Step S8 to select the independent control for each of the two wheels FL, FR. Thus, one control cycle in accordance with the routine of FIG. 4 is ended. Consequently the brake pressures being applied to the two wheels FL, FR are controlled or changed, as shown in FIG. 5, while those pressures are permitted to have a great difference.

Assuming that subsequently the vehicle deceleration increases up to a value higher than the second reference value B, a positive judgment is made at each of Steps S2 and S3, a negative judgment is made at each of Step S4, and a positive judgment is made at Step S6, so that the control of the CPU 62 goes to Step S7 to select the mode-change control for the two wheels FL, FR. In the mode-change control, when the PD mode is requested for one wheel, a higher pressure-change-level mode which would be requested for the other wheel in the independent control is changed to a lower pressure-change-level mode, e.g., PD mode. Thus, the difference between the respective brake pressures being applied to the two wheels FL, FR is prevented from being increased.

Assuming that in the current anti-lock control operation the vehicle deceleration remains lower than the first reference value A, a negative judgment is made at Step S3, and the control of the CPU 62 goes to Step S8 to select the independent control for the two wheels FL, FR.

Meanwhile, assuming that the current pressure control is now in the initial PD control period and that the vehicle deceleration is lower than the first reference value A because the driver has pressed the brake pedal 20 on a road surface having a low friction coefficient $\mu$, a positive judgment is made at Step S2 and a negative judgment is made at Step S3, and the control of the CPU 62 goes to Step S8 to select the independent control. Thus, one control cycle in accordance with the routine of FIG. 4 is ended.

It emerges from the foregoing description that in the present embodiment, in the case where the vehicle deceleration is lower than the first reference value A, neither of the low-select control and the mode-change control each as a left-and-right-wheel torque-difference limiting control is carried out for the front wheels FL, FR, but the independent control is carried out. Therefore, when the driver quickly presses the brake pedal 20 on the road surface whose friction coefficient $\mu$ is low, the sum of respective braking forces applied to the two wheels FL, FR is maximized and accordingly the braking distance is easily shortened.

The low-select control is a left-and-right-wheel torque-difference limiting control in which the generation of difference between the braking pressures applied to the left and right front wheels FL, FR is strictly limited for positively preventing the change of running direction of the vehicle, whereas the mode-change control is another left-and-right-wheel torque-difference limiting control in which the generation of difference between the braking pressures applied to the two front wheels FL, FR is less strictly limited for less positively preventing the change of running direction of the vehicle.

In the case where the driver strongly presses the brake pedal 20 on the road surface with the high friction coefficient $\mu$, if the low-select control is started before the vehicle deceleration increases up to a sufficiently high value, for the purpose of preventing early the change of running direction of the vehicle due to the production of difference between the braking pressures applied to the left and right front wheels FL, FR, then the necessity to continue the low-select control for positively preventing the change of running direction of the vehicle is significantly reduced after the vehicle deceleration has increased up to the sufficiently high value, that is, the mode-change control which contributes to increasing the sum of respective braking forces applied to the two wheels FL, FR suffices for achieving the aim of preventing the change of running direction of the vehicle. Thus, in this case, the low-select control is started before the vehicle deceleration has increased up to the sufficiently high value.

In the present embodiment, both the low-select control and the mode-change control are employed each as the left-and-right-wheel torque-difference limiting control. In the case where the driver strongly presses the brake pedal 20 on the road surface with the high friction coefficient μ, if the vehicle deceleration is not lower than the first reference value A and is lower than the second reference value B higher than the first value A, the low-select control is selected, and if the vehicle deceleration is not lower than the second reference value B, the mode-change control is selected. Thus, both the prevention of change of running direction of the vehicle's body and the shortening of braking distance of the vehicle's body are simultaneously achieved with satisfaction.

As is apparent from the foregoing description, the routine of FIG. 4 and a portion of the control unit 60 for carrying out the routine cooperate with each other to provide a torque-difference control means.

While the present invention has been described in its preferred embodiment, the present invention may otherwise be embodied.

For example, in the illustrated embodiment, the left-and-right-wheel torque-difference limiting rule in which the mode-change control as the left-and-right-wheel torque-difference limiting control is used to control the braking torques applied to the wheels of the vehicle is employed together with the technique of selecting, based on the vehicle deceleration, an appropriate one of the torque-difference limiting rule and the normal rule in which the independent control is used for the same purpose. However, it is possible to employ the mode-change control independent of that technique. For example, the mode-change control may be employed with the technique of fixing a braking-torque control rule independent of the vehicle deceleration; it may be employed as a torque control which is performed before the low-select control is performed; or it may be employed in an anti-lock control in which no low-select control is employed.

It is to be understood that the present invention may be embodied with other changes, improvements, and modifications that may occur to those skilled in the art without departing from the scope and spirit of the invention defined in the appended claims.

What is claimed is:

1. An apparatus for controlling a left-wheel and a right-wheel braking torque applied to a left and a right wheel of a motor vehicle running on a road surface, respectively, when the vehicle is braked, comprising:

a torque changing device which changes each of said left-wheel and right-wheel braking torques; and a controller which controls, in an anti-lock control mode thereof, said torque changing device to prevent each of said left and right wheels from being locked on the road surface, said controller comprising torque-difference control means for controlling said torque changing device to change at least one of said left-wheel and right-wheel braking torques such that a difference between the left-wheel and right-wheel braking torques is smaller when a deceleration of the vehicle is higher than a threshold value than when said deceleration is not higher than said threshold value wherein said controller further comprises:

normal control means for controlling said torque changing device to change said at least one of said left-wheel and right-wheel braking torques, so that said each of said left and right wheels is prevented from being locked on the road surface; and special control means for controlling said torque changing device to change said at least one of said left-wheel and right-wheel braking torques such that the difference between the left-wheel and right-wheel braking torques when said special control means controls the torque changing device is smaller than the difference between the left-wheel and right-wheel braking torques when said normal control means controls the torque changing device, so that said each of said left and right wheels is prevented from being locked on the road surface, and wherein said torque-difference control means comprises selecting means for, when said deceleration of the vehicle is higher than said threshold value, selecting said special control means for controlling said torque changing device, and inhibiting said normal control means from controlling the torque changing device and, when said deceleration is not higher than said threshold value, selecting said normal control means for controlling the torque changing device, and inhibiting said special control means from controlling the torque changing device.

2. An apparatus according to claim 1, wherein said normal control means comprises independent control means for selecting one of a plurality of torque control modes, based on a parameter relating to a lock tendency of each one of said left and right wheels, independent of the other wheel, and controlling, in the selected torque control mode, said torque changing device to change a corresponding one of the left-wheel and right-wheel braking torques, independent of the other braking torque, said plurality of torque control modes comprising a torque-increase preventing mode in which the torque changing device prevents each one of said left-wheel and right-wheel braking torques from being increased, and wherein said special control means comprises first control means for, in a case where two expected torque control modes are different from each other, and where one of said two expected torque control modes is equal to said torque-increase preventing mode, controlling said torque changing device such that a corresponding one of said left-wheel and right-wheel braking torques is changed in said torque-increase preventing mode, and such that the other braking torque is changed in one of said plurality of torque control modes in which the torque changing device is permitted to change said other braking torque to a value smaller than a value to which said other braking torque would be changed by the torque changing device in the other expected torque control mode, said two expected torque control modes being expected to be selected as one of said plurality of torque control modes with relation to said left and right wheels, respectively, on condition that said independent control means is operated with relation to said left and right wheels.

3. An apparatus according to claim 2, wherein said first control means comprises operating means for operating said independent control means to select said one torque control mode based on said parameter relating to said lock tendency of said each of said left and right wheels and, when said different ones of said plurality of torque control modes are selected for said left and right wheels, respectively, and when said one of the selected torque control modes is said torque-increase preventing mode, controlling said torque changing device to change, in said torque-increase preventing mode, said corresponding one of said left-wheel and right-wheel braking torques and change the other braking torque in said one of said plurality of torque control modes in which the torque changing device changes said other braking torque to said value smaller than said value to which said other braking torque would be changed by the torque changing device in the other selected torque control mode.

4. An apparatus according to claim 2, wherein said torque-increase preventing mode comprises a torque decreasing mode in which said torque changing device is permitted to decrease each one of said left-wheel and right-wheel braking torques.

5. An apparatus according to claim 2, wherein said special control means comprises second control means for, in a case where said two expected torque control modes are different from each other, and where one of said two expected torque control modes is equal to said torque-increase preventing mode, controlling said torque changing device such that each of said left-wheel and right-wheel braking torques is changed in said torque-increased preventing mode.

6. An apparatus according to claim 5, wherein said selecting means comprises means for, when said deceleration of the vehicle is higher than a first threshold value in an initial period of the operation of said controller in said anti-lock control mode, selecting said second control means for controlling said torque changing device and inhibiting each of said independent control means and said first control means from operating the torque changing device; when said deceleration is higher than said first threshold value and is not higher than a second threshold value higher than said first threshold value after said initial period, selecting said independent control means for controlling said torque changing device and inhibiting each of said first and second control means from operating the torque changing device; and, when said deceleration is higher than said second threshold value higher than said first threshold value after said initial period, selecting said first control means for controlling said torque changing device and inhibiting each of said independent and second control means from operating the torque changing device.

7. An apparatus according to claim 5, wherein said controller further comprises means for terminating the operation of said second control means when said second control means has continued controlling said torque changing device for more than a first reference time.

8. An apparatus according to claim 5, wherein said second control means comprises operating means for operating said independent control means to select said one torque control mode based on said parameter relating to said lock tendency of said each of said left and right wheels and, when said different ones of said plurality of torque control modes are selected for said left and right wheels, respectively, and when said one of the selected torque control modes is said torque-increase preventing mode, controlling said torque changing device to change, in said torque-increase preventing mode, said each of said left-wheel and right-wheel braking torques.

9. An apparatus according to claim 2, wherein said controller further comprises means for terminating the operation of said first control means when said deceleration of the vehicle has decreased down to lower than said second threshold value.

10. An apparatus according to claim 2, wherein said controller further comprises means for terminating the operation of said first control means when said first control means has continued to control said torque changing device for more than a second reference time and initiating the operation of said independent control means to change said other braking torque in said other selected torque control mode.

11. An apparatus for controlling a left-wheel and a right-wheel braking torque applied to a left and a right wheel of a motor vehicle running on a road surface, respectively, when the vehicle is braked, comprising:

a torque changing device which changes each of said left-wheel and right-wheel braking torques; and a controller which controls, in an anti-lock control mode thereof, said torque changing device to prevent each of said left and right wheels from being locked on the road surface, said controller comprising control means for, (a) when different ones of a plurality of torque control modes comprising a torque decreasing mode in which said torque changing device is permitted to decrease each one of said left-wheel and right-wheel braking torques, are selected based on respective parameters relating to respective lock tendencies of said left and right wheels, independent of each other, and (b) when one of said different torque control modes which is selected for a corresponding one of the left and right wheels is said torque decreasing mode, controlling the torque changing device to change a corresponding one of said left-wheel and right-wheel braking torques in said torque decreasing mode and change the other braking torque in one of said plurality of torque control modes in which the torque changing device is capable of changing said other braking torque to a value smaller than a value to which said other braking torque would be changed by the torque changing device in the other of said different torque control modes selected for the other of the left and right wheels.

12. An apparatus according to claim 11, wherein said controller further comprises mode selecting means for selecting said one of said plurality of torque control modes based on said parameter relating to the lock tendency of said each one of said left and right wheels, independent of the other wheel.

13. An apparatus for controlling a left-wheel and a right-wheel braking torque applied to a left and a right wheel of a motor vehicle, comprising:

a torque changing device which changes each of said left-wheel and right-wheel braking torques; and a controller which controls said torque changing device to prevent each of said left and right wheels from being locked, said controller including control means for, in a case where two expected torque control modes are different from each other, and where one of said two expected torque control modes is equal to said torque-increase preventing mode, controlling said torque changing device such that a corresponding one of said left-wheel and right-wheel braking torques is changed to said torque-increase preventing mode, and such that the other braking torque is changed in one of said plurality of torque control modes in which the torque changing device is permitted to change said other braking torque to a value smaller than a value to which said other braking torque would be changed by the torque changing device in the other expected torque control mode, said two expected torque control modes being expected to be selected as one of a plurality of torque control modes with relation to said left and right wheels, respectively, independently of each other, on the basis of at least one parameter relating to a lock tendency of each of said left and right wheels, said plurality of torque control modes including said torque-increase preventing mode in which the torque changing device prevents each one said left-wheel and right-wheel braking torques from being increased.

14. An apparatus according to claim 13, wherein said controller further comprises mode selecting means for selecting one of said plurality of torque control modes with relation to each one of said left and right wheels, independently of the other wheel, on the basis of said at least one parameter with relation to said each one of said left and right wheels.

15. An apparatus for controlling a left-wheel and a right-wheel braking torque applied to a left and a right wheel of a motor vehicle running on a road surface, respectively, when the vehicle is braked, comprising:
- a torque changing device which changes each of said left-wheel and right-wheel braking torques; and
- a controller which controls, in an anti-lock control mode thereof, said torque changing device to prevent each of said left and right wheels from being locked on the road surface, said controller comprising torque-difference control means for controlling said torque changing device to change at least one of said left-wheel and right-wheel braking torques such that a difference between the left-wheel and right-wheel braking torques is smaller when a deceleration of the vehicle is higher than a threshold value than when said deceleration is not higher than said threshold value wherein the motor vehicle includes a front left wheel, a front right wheel, a rear left wheel, and a rear right wheel, and wherein said left and right wheels of the vehicle comprise said front left and right wheels.

* * * * *